(12) United States Patent
Josien et al.

(10) Patent No.: US 6,998,101 B2
(45) Date of Patent: Feb. 14, 2006

(54) CRYSTALLIZED IM-8 SOLID OF METALLOPHOSPHATE TYPE AND PROCESS FOR THE PREPARATION THEREOF

(75) Inventors: Ludovic Josien, Mulhouse (FR); Angélique Simon-Masseron, Brunstatt (FR); Joël Patarin, Flaxlanden (FR); Loïc Rouleau, Charly (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 42 days.

(21) Appl. No.: 10/831,128

(22) Filed: Apr. 26, 2004

(65) Prior Publication Data

US 2004/0258600 A1    Dec. 23, 2004

(30) Foreign Application Priority Data

Apr. 24, 2003    (FR) .................................. 03 05208

(51) Int. Cl.
*C01B 37/00*    (2006.01)
(52) U.S. Cl. ................ 423/305; 423/306; 423/DIG. 30
(58) Field of Classification Search ................ 423/305, 423/306, DIG. 30; 502/208, 214
See application file for complete search history.

(56) References Cited

U.S. PATENT DOCUMENTS 4,310,440 A * 1/1982 Wilson et al. ............... 502/208
4,440,871 A * 4/1984 Lok et al. .................... 502/214

OTHER PUBLICATIONS

Chippindale A M et al.; "CoGaPO-5: Synthesis and crystal structure of (C6N2H14)2'Co4Ga5P9O36!, a microporpous cobalt-gallium phosphate with a novel framework topology" Zeolites, Elsevier Science Publishing, U.S. vol. 18, No. 2, Feb. 1, 1997 pp. 176-181.

Bond A D et al.: "Synthesis and characterization of transition-metal-substituted gallium phosphates with the laumonite structure" Zeolites, Elsevier Science Publishing, U.S. vol. 19, No. 5-6, Nov. 12, 1997, pp. 326-333.

Reinert P. et al.: "Synthesis, characterization and structure determination of a new fluorogallophosphate (Mu-3) prepared in the presence of ethylene glycol as main solvent" Microporous and Mesoporous Materials, Elsevier Science Publishing, New York, US, vol. 22, No. 1-3, Jun. 17, 1998, pp. 43-55.

Chippindale A M et al.: "Heteroatom-substituted microporous gallium phosphates" Microporous and Mesoporous Materials, Elsevier Science Publsihing, New York, US vol. 21, No. 4-6, May 1, 1998 pp. 271-279.

* cited by examiner

*Primary Examiner*—David Sample
(74) *Attorney, Agent, or Firm*—Millen, White, Zelano & Branigan, P.C.

(57) ABSTRACT

A crystallized solid of metallophosphate type, referred to by the designation IM-8 can be partially substituted by an element X and optionally by an element Y. The metallophosphate is of a chemical composition, expressed on an anhydrous basis is defined by the formula $R_s(G_gP_pX_xY_y)O_2$ in which G represents one or more trivalent elements, R represents one or more organic compounds, X represents one or more divalent elements, and Y represents one or more tetravalent elements, and in which $s \leq 0.2$, $g \leq 0.5$, $p \leq 0.5$, $x \leq 0.4$ and $y \leq 0.3$ with $g+p+x+y=1$. The crystallized solid is useful as an adsorbent.

20 Claims, 1 Drawing Sheet

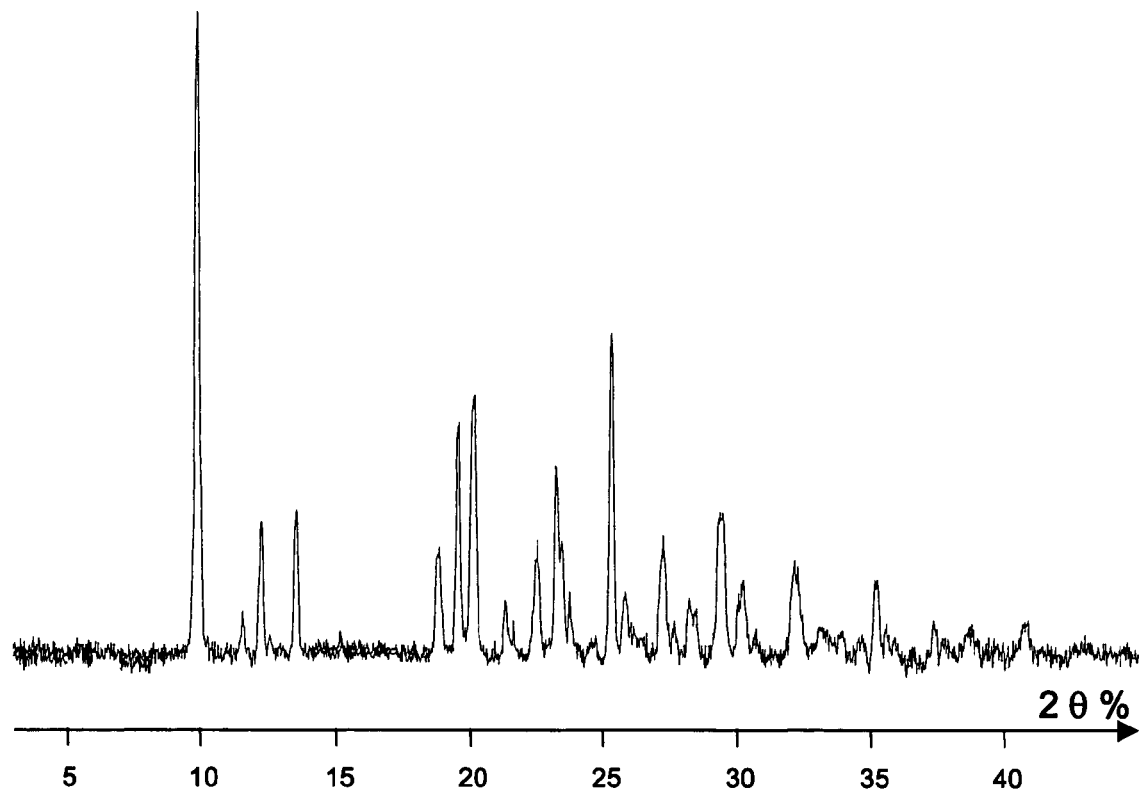

CRYSTALLIZED IM-8 SOLID OF METALLOPHOSPHATE TYPE AND PROCESS FOR THE PREPARATION THEREOF

The invention relates to a novel crystallised solid of metallophosphate type, referred to hereinafter as an IM-8 solid, having a novel crystalline structure, and to the process for the preparation of said IM-8 solid.

Crystallised microporous solids have been known for many years. Essentially two families are to be found amongst them: zeolites (crystallised aluminosilicates) and related solids of metallophosphate type. At the beginning of the 1980s the first synthesised metallophosphates were aluminophosphates (U.S. Pat. No. 4,310,440). In those compounds the basic elements and in particular aluminium can be partially substituted by other elements such as silicon (U.S. Pat. No. 4,440,871) or transition metals (M Hartmann, L Kevan, Chem Rev, 1999, 99 635). Those microporous phosphates have ion exchange properties as well as acid catalyst properties in various chemical reactions. The use of gallium as a replacement for aluminium in the synthesis procedures made it possible to produce microporous gallium phosphates, also referred to as gallophosphates (for example EP-A-0 226 219; U.S. Pat. No. 5,420,279). More recently other metallophosphates were discovered: the metal constituting the basic structure may be in particular zinc, iron, vanadium, nickel etc . . . (A K Cheetham, G Férey, T Loisea, Angew Chem Int Ed, 1999, 38, 3268). Like aluminophosphates, gallophosphates may be partially substituted by transition metals (P Feng, X Bu, G D Stucky, Nature, 1997, 388, 735) and can thus have ion exchange and acidity properties. Among those substituted gallophosphates, some have structures of zeolitic type. Other original zeolitic structures such as the structural types CGF (CoGaPO-5) (A M Chippindale, A R Cowley, Zeolites, 1997, 18, 176), CGS (CoGaPO-6) (A R Cowley, A M Chippindale, Microporous Mesoporous Mater, 1999, 28, 163), SBS (UCSB-6) and SBT (UCSB-10) (X Bu, P Feng, G D Stucky, Science, 1997, 278, 2080) have also been discovered. Most of those substituted gallophosphates were synthesised in a quasi non-aqueous medium in the presence of an organic solvent such as ethylene glycol (A M Chippindale, A R Cowley, Microporous Mesoporous Mater, 1998, 21, 271). In general terms metallophosphates are usually obtained by hydro- or organothermal crystallisation of a reaction mixture comprising a phosphate anion source, generally orthophosphoric acid, a source of the required metal, generally an oxide, a carbonate, an ester or an ether of that metal, a structuring agent, in particular an amine, an ammonium cation or a cation of groups IA and IIA, optionally a mobilising agent, for example the fluoride or hydroxyl anion, and a solvent (water or organic solvent).

The present invention relates to a novel crystallised solid of metallophosphate type, referred to as a crystallised IM-8 solid, and having in its raw synthesis form an X-ray diffraction diagram including at least the lines set forth in Table 1. That diagram is shown in FIG. 1. The novel crystallised IM-8 solid of metallophosphate type has a novel crystalline structure.

That diffraction diagram is obtained by radiocrystallographic analysis by means of a diffractometer using the conventional method of powders with radiation $K\alpha_1$ of copper ($\lambda=1.5406$ Å). From the position of the diffraction peaks represented by the angle $2\theta$, the Bragg equation is used to calculate the characteristic lattice equidistances $d_{hkl}$ of the sample. The estimate of the measurement error $\Delta(d_{hkl})$ on $d_{hkl}$ is calculated by the Bragg equation in dependence on the absolute error $\Delta(2\theta)$ allotted to the measurement of $2\theta$. An absolute error $\Delta(2\theta)$ equal to $\pm 0.2°$ is generally accepted. The relative intensity $I_{rel}$ related to each value of $d_{hkl}$ is measured according to the height of the corresponding diffraction peak. The X-ray diffraction diagram of the crystallised IM-8 solid according to the invention comprises at least the lines at the values of $d_{hkl}$ set forth in Table 1. In the column of the $d_{hkl}$ values, the Table indicates the mean values of the inter-lattice distances in Angstroms (Å). Each of those values is to be affected by the measurement error $\Delta(d_{hkl})$ of between $\pm 0.2$ Å and $\pm 0.008$ Å.

TABLE 1

Mean values of the $d_{hkl}$ and relative intensities measured on an X-ray diffraction diagram of the crystallised IM-8 solid of the invention

| $d_{hkl}$ (Å) | $2\theta$ (degrees) | I/I0 |
|---|---|---|
| 8.93 | 9.89 | FF |
| 7.65 | 11.55 | ff |
| 7.21 | 12.26 | f |
| 7.03 | 12.59 | ff |
| 6.53 | 13.55 | f |
| 4.71 | 18.84 | f |
| 4.53 | 19.58 | mf |
| 4.41 | 20.13 | mf |
| 4.17 | 21.30 | ff |
| 4.10 | 21.64 | ff |
| 3.944 | 22.53 | f |
| 3.825 | 23.24 | mf |
| 3.795 | 23.42 | f |
| 3.744 | 23.75 | ff |
| 3.624 | 24.54 | ff |
| 3.518 | 25.29 | m |
| 3.449 | 25.81 | ff |
| 3.270 | 27.25 | f |
| 3.223 | 27.66 | ff |
| 3.159 | 28.23 | ff |
| 3.133 | 28.46 | ff |
| 3.035 | 29.40 | f |
| 2.971 | 30.05 | ff |
| 2.953 | 30.24 | f |
| 2.908 | 30.72 | ff |
| 2.784 | 32.12 | f |
| 2.769 | 32.30 | ff |
| 2.706 | 33.07 | ff |
| 2.641 | 33.91 | ff |
| 2.588 | 34.63 | ff |
| 2.548 | 35.19 | ff |
| 2.524 | 35.54 | ff |
| 2.502 | 35.86 | ff |
| 2.407 | 37.32 | ff |
| 2.382 | 37.73 | ff |
| 2.329 | 38.63 | ff |
| 2.220 | 40.61 | ff |
| 2.211 | 40.78 | ff | in which FF=very high; F=high; m=medium; mf=medium low; f=low; ff=very low.

Relative intensity $I/I_0$ is given in relation to a scale of relative intensity in which a value of 100 is attributed to the most intense line of the X-ray diffraction diagram: ff<15; $15 \leq f<30; 30 \leq mf<50; 50 \leq m<65; 65 \leq F<85; FF \geq 85$.

Preferably the crystallised IM-8 solid of metallophosphate type is a gallophosphate.

In accordance with a preferred embodiment of the invention the metal constituting the crystalline structure of the IM-8 solid of metallophosphate type is partially substituted by one or more chemical elements of different nature. The metallophosphate according to the invention which may or may not be substituted has, in its raw synthesis form, a chemical composition, expressed in terms of an anhydrous base, defined by the following general formula: $R_s(G_gP_pX_x\text{-}Y_y)O_2$ (I), in which G represents one or more trivalent elements, R represents one or more organic compounds, X represents one or more divalent compounds and Y represents one or more tetravalent compounds. In the formula (I), g, s, p, x and y represent the number of moles of each of the elements G, R, P, X and Y for two moles of oxygen atoms and the values thereof are such that s is less than or equal to 0.2, g is less than or equal to 0.5, p is less than or equal to 0.5, x is less than or equal to 0.4 and y is less than or equal to 0.3, with g+p+x+y=1. Preferably s is between 0.06 and 0.17, g is between 0.2 and 0.4, p is between 0.4 and 0.5, x is between 0.1 and 0.3 and y is between 0 and 0.1 and still more preferably y is between 0 and 0.085.

The partially substituted metallophosphate in its raw synthesis form has a crystalline structure giving an X-ray diffraction diagram similar to that given by the crystalline structure of the IM-8 (FIG. 1) and including at least the same lines as those set forth in Table 1. Insignificant differences may possibly be observed in relation to the mean values $d_{hkl}$ and the relative intensities $I/I_0$ set out in Table 1 by virtue of the nature and the quantity of the elements G, X, Y or R which are present in the solid.

In accordance with this embodiment of the invention in which the crystallised IM-8 solid is a partially substituted metallophosphate, G is preferably selected from the elements of group IIIA of the periodic classification of elements and preferably selected from boron, aluminium, gallium and the mixture of at least two of those elements. Preferably G is aluminium and/or gallium. Very preferably G is gallium. The element X is preferably selected from the metals in the group formed by cobalt, zinc, manganese, copper, nickel, magnesium and the mixture of at least two of those metals. Very preferably the element X is cobalt. The element Y is preferably selected from silicon, germanium, titanium and the mixture of at least two of those metals. Very preferably the element Y is silicon. A very preferred composition of the crystallised IM-8 solid according to the invention is such that it comprises cobalt, phosphorus and gallium. The element R representing one or more organic compounds may be the organic structuring agent used in preparation of the crystallised IM-8 solid as described hereinafter in this description. In general the element R is an amine. In particular it may involve a cyclic amine and preferably an alkylpiperazine. R is preferably 1,4-dimethylpiperazine, 1-ethylpiperazine, 1-methylpiperazine or precursors thereof or decomposition products thereof.

In its raw synthesis form the crystallised IM-8 solid of metallophosphate or substituted metallophosphate type according to the invention contains, occluded in said passages, the protoned organic structuring agent used in the synthesis procedure and a certain quantity of water of hydration. That organic structuring agent compensates for the negative charge of the structure. Dehydration of the raw synthesis solid by heating to about 180° C. generally does not cause removal of the organic structuring agent. The organic structuring agent may be eliminated by the conventional procedures known in the state of the art such as chemical treatments and/or heat treatments. In the case of heat treatment of the raw synthesis form the temperature is generally higher than 400° C. and preferably between 450° C. and 550° C. After the heat treatment the solid obtained contains organic structuring agent in a quantity much less than in the raw synthesis solid, to the extent that the organic structuring agent is eliminated for the major part thereof. Preferably, after the heat treatment, the solid obtained no longer contains any organic structural agent.

The invention also concerns the process for synthesis of the crystallised IM-8 solid. The crystallised IM-8 solid of metallophosphate type according to the invention is obtained by hydro- or organothermal crystallisation of a reaction mixture comprising a phosphate anion source, generally orthophosphoric acid, a source of the metal required, preferably a source of gallium, generally in the form of an oxide, a carbonate, an ester or an ether of said metal, a structuring agent, in particular an amine, an ammonium cation or a cation of groups IA and IIA, optionally a mobilising agent, for example the fluoride or hydroxyl anion, and a solvent (water or organic solvent). More precisely the process comprises preparing a reaction mixture referred to as a gel and containing one or more hydroxylated organic solvents such as ethylene glycol or glycerol, one or more sources of phosphorus, one or more sources of the element G, one or more sources of the element X, optionally one or more sources of the element Y and one or more sources of the element R which are selected from the organic structuring agents, preferably nitrogen-bearing organic structuring agents, their precursors and their decomposition products. The gel optionally contains water. The quantities of said reactants are adjusted in such a way as to impart to the gel a composition permitting crystallisation thereof in the form of a crystallised IM-8 solid of the formula $R_s(G_gP_pX_xY_y)O_2$ in which R, G, X and Y and s, g, p, x and y comply with the criteria defined hereinbefore. The gel is then subjected to a hydrothermal treatment until the crystallised IM-8 solid is formed. The gel is advantageously put under hydrothermal conditions at a temperature of less than 200° C. and preferably between 100 and 200° C. and still more preferably between 150 and 200° C. and under a pressure at least equal to the autogenous pressure of the mixture formed by said gel for a sufficient period of time for the formation of the crystallised IM-8 solid. Heating of the gel is preferably effected in an autoclave and crystallisation can be implemented with or without agitation. The period of time necessary to achieve crystallisation depends on the composition of the gel, in particular the addition of seeds, the agitation and the heating temperature. That period of time is generally between 1 and 30-days and preferably between 5 and 20 days. When crystallisation is concluded the solid is separated from the mother liquors by centrifuging or by filtration, then washed with demineralised water, dried and modified by heat and/or chemical treatments in such a way as to remove the organic structural agent, and shaped according to the methods known to the man skilled in the art. The structuring agent can be eliminated in accordance with the conventional methods known in the state of the art as described hereinbefore.

Advantageously the molar composition of the gel is such that:

| | |
|---|---|
| $P_2O_5$ | 0.25–4 |
| $G_2O_3$ | 0.05–3 |
| XO | 0.5–8 |
| $YO_2$ | 0–4 |
| R | 0.5–8 |
| $H_2O$ | <50 |
| Solvent (ethylene glycol, . . .) | 10–1000 |

Still more advantageously the molar composition of the gel is such that:

| | |
|---|---|
| $P_2O_5$ | 0.5–1.5 |
| $G_2O_3$ | 0.25–1 |
| XO | 1–3 |
| $YO_2$ | 0–2 |
| R | 1–3 |
| $H_2O$ | <20 |
| Solvent (ethylene glycol, . . .) | 25–100. |

The most appropriate phosphorus source is concentrated orthophosphoric acid but its salts and esters such as alkali metal phosphates, reactive phosphates of trivalent element G and in particular gallium phosphates and alkyl phosphates are also suitable.

The source of the element G is advantageously selected from oxides, oxyhydroxides, hydroxides or alkoxides of that element. The salts of the element G, in particular chloride, nitrate and sulphate are also appropriate. It is also possible to use a common source for the elements G and P such as a gallophosphate. Gallium oxyhydroxide is preferably used when the element G is gallium.

The source of the metal X is advantageously selected from salts, for example carbonate, chloride, nitrate, sulphate, acetate, hydroxides, oxides and alkoxides. When the element X is cobalt cobalt acetate is preferably used.

The source of the element Y can be any compound which comprises the element Y and which can liberate that element in aqueous solution or in an organic solvent in reactive form. Advantageously, when the element Y is silicon, this involves a silica, in particular a silica sol, combustion silica, precipitated silica or a silicon alkoxide. A suspension of combustion silica is preferably used.

It is also advantageous to add seeds to the reaction mixture in order to reduce the time required for formation of the crystallised IM-8 solid according to the invention, to promote the formation thereof to the detriment of impurities or to control the size of the crystals. Such seeds comprise crystallised solids, in particular structures involving the structure of the IM-8 solid according to the invention. The crystalline seeds are generally added in a proportion of between 0.01 and 10% by weight of phosphate of the element G used in the reaction mixture.

The crystallised IM-8 solid of metallophosphate or substituted metallophosphate type according to the invention may be an attractive proposition for various applications, in particular as a catalyst element or an adsorbent element in refining and in petrochemistry.

BRIEF DESCRIPTION OF THE FIGURE

The FIGURE is an x-ray diffraction pattern of IM-8.

The invention is illustrated by the following examples given by way of non-limiting example.

EXAMPLE 1

Synthesis of a Gallophosphate Compound Substituted by Co of Structure IM-8

0.28 g of hydrated gallium oxyhydroxide ($GaOOHo.xH_2O$ containing about 9% by mass of water) and 1.24 g of tetrahydrated cobalt acetate (Fluka) are put into suspension in 7.70 g of ethylene glycol (SDS). The gallium oxyhydroxide is obtained by evaporation of a solution of gallium nitrate on a sand bed at a temperature of 250° C. for a period of 24 hours. The procedure then involves the addition with agitation of 0.58 g of 85% orthophosphoric acid (Labosi) and then 0.50 g of N-methylpiperazine (Aldrich) after 10 minutes of agitation. The reaction mixture formed in that way, being of the consistency of a gel, is matured with agitation for a period equal to about 1 hour.

The molar composition of the gel (reaction medium prepared in that way, expressed in respect of oxide and in relation to 1 mole of $P_2O_5$) is as follows:

0.5 $Ga_2O_3$:2 $Co(CH_3CO_2)_2$:1 $P_2O_5$: 10$H_2O$: 2N-methylpiperazine: 50 ethlene glycol.

The reaction mixture is transferred into a steel autoclave provided with a casing of polytetrafluoroethylene (PTFE) of a capacity of 20 cm$^3$ and then heated without agitation at 180° C. for a period equal to 15 days to form a crystallised product. After cooling the crystallised solid obtained is washed with demineralised water and then subjected to an ultrasound treatment for a period of a few minutes. After drying at 60° C., the result obtained is a powder constituting the crystallised solid of structure IM-8. The values of the angles 2θ of the lines of the X-ray diffraction diagram of that product correspond to the values of Table 1 and to the diffractogram shown in FIG. I. Chemical analysis of the solid results in the following formula expressed in respect of oxide ($TO_2$, with T=Ga, Co, P) [$(C_5H_{12}N_2)_{0.1}$ $Ga_{0.3}P_{0.5}Co_{0.2}]O_2$.

What is claimed is:

1. A crystallized IM-8 solid metallophosphate having in its as-synthesized form an X-ray diffraction diagram including at least the lines set forth in the Table hereinafter:

| $d_{hkl}$ (Å) | 2θ (degrees) | I/I0 |
|---|---|---|
| 8.93 | 9.89 | FF |
| 7.65 | 11.55 | ff |
| 7.21 | 12.26 | f |
| 7.03 | 12.59 | ff |
| 6.53 | 13.55 | f |
| 4.71 | 18.84 | f |
| 4.53 | 19.58 | mf |
| 4.41 | 20.13 | mf |
| 4.17 | 21.30 | ff |
| 4.10 | 21.64 | ff |
| 3.944 | 22.53 | f |
| 3.825 | 23.24 | mf |
| 3.795 | 23.42 | f |
| 3.744 | 23.75 | ff |
| 3.624 | 24.54 | ff |
| 3.518 | 25.29 | m |
| 3.449 | 25.81 | ff |
| 3.270 | 27.25 | f |
| 3.223 | 27.66 | ff |
| 3.159 | 28.23 | ff |
| 3.133 | 28.46 | ff |
| 3.035 | 29.40 | f |
| 2.971 | 30.05 | ff |
| 2.953 | 30.24 | f |
| 2.908 | 30.72 | ff |
| 2.784 | 32.12 | f |
| 2.769 | 32.30 | ff |
| 2.706 | 33.07 | ff |
| 2.641 | 33.91 | ff |
| 2.588 | 34.63 | ff |
| 2.548 | 35.19 | ff |
| 2.524 | 35.54 | ff |
| 2.502 | 35.86 | ff |
| 2.407 | 37.32 | ff |
| 2.382 | 37.73 | ff |
| 2.329 | 38.63 | ff |
| 2.220 | 40.61 | ff |
| 2.211 | 40.78 | ff | in which FF=very high; F=high; m=medium; mf=medium low; f=low; ff=very low, and being of a chemical composition, expressed in terms of an anhydrous base, defined by the following general formula: $R_s(G_gP_pX_xY_y)O_2$, in which G represents one or more trivalent elements, R represents one or more organic compounds, X represents one or more divalent compounds and Y represents one or more tetravalent compounds and in which s is less than or equal to 0.2, g is less than or equal to 0.5, p is greater than zero and less than or equal to 0.5, x is less than or equal to 0.4 and y is less than or equal to 0.3, with g+p+x+y=1.

2. A crystallized IM-8 solid according to claim 1 wherein the element G is gallium, and g is a value above zero.

3. A crystallized IM-8 solid according to claim 2 wherein the element X is cobalt, zinc, manganese, copper, nickel, magnesium or a mixture of at least two X elements, and x is a value above zero.

4. A crystallized IM-8 solid according to claim 3 wherein the element Y is silicon, germanium, titanium or a mixture of at least two Y elements and y is a value above zero.

5. A crystallized IM-8 solid according to claim 4 wherein the element R is an amine, and s is a value above zero.

6. A crystallized IM-8 solid according to claim 3 wherein the element R is an amine, and s is a value above zero.

7. A crystallized IM-8 solid according to claim 2 wherein the element Y is silicon, germanium, titanium or a mixture of at least two Y elements and y is a value above zero.

8. A crystallized IM-8 solid according to claim 7 wherein the element R is an amine, and s is a value above zero.

9. A crystallized IM-8 solid according to claim 2 wherein the element R is an amine, and s is a value above zero.

10. A crystallized IM-8 solid according to claim 1 wherein the element. X is cobalt, zinc, manganese, copper, nickel, magnesium or a mixture of at least two X elements, and x is a value above zero.

11. A crystallized IM-8 solid according to claim 10 wherein the element R is an amine, and s is a value above zero.

12. A crystallized IM-8 solid according to claim 1 wherein the element Y is silicon, germanium, titanium or a mixture of at least two Y elements and y is a value above zero.

13. A crystallized IM-8 solid according to claim 12 wherein the element R is an amine, and s is a value above zero.

14. A crystallized IM-8 solid according to claim 1 wherein the element R is an amine, and s is a value above zero.

15. A crystallized IM-8 solid according to claim 1 wherein the element R is an alkylpiperazine.

16. A crystallized IM-8 solid according to claim 15 comprising cobalt, gallium and phosphorus.

17. A crystallized IM-8 solid according to claim 1 comprising cobalt, gallium and phosphorus.

18. A process for the preparation of a crystallized IM-8 solid according to claim 1 which comprises forming a reaction mixture of one or more sources of phosphorus, one or more sources of the element G, one or more sources of the element X, optionally one or more sources of the element Y, one or more sources of the element R selected from organic structuring agents, their precursors and their decomposition products, one or more hydroxylated organic solvents, and then subjecting the reaction mixture to hydrothermal treatment until said crystallized IM-8 solid crystallizes.

19. A preparation process according to claim 18 wherein the composition of the reaction mixture comprises:

| | |
|---|---|
| P2O$_5$ | 0.25–4 moles |
| G2O$_3$ | 0.05–3 moles |
| XO | 0.5–8 moles |
| YO$_3$ | 0–4 moles |
| R | 0.5–8 moles |
| H$_2$O | <50 moles |
| Solvent | 10–1000 moles. |

20. A process according to claim 18 wherein seeds are added to the reaction mixture.

* * * * *